(12) United States Patent
Cascone

(10) Patent No.: US 7,885,692 B2
(45) Date of Patent: Feb. 8, 2011

(54) HAT CELL PHONE OR WIRELESS DEVICE FOR HANDS-FREE USER-SAFE OPERATION

(76) Inventor: Peter Cascone, 310 Lexington Ave., 12A, New York, NY (US) 10016

( * ) Notice: Subject to any disclaimer, the term of this patent is extended or adjusted under 35 U.S.C. 154(b) by 755 days.

(21) Appl. No.: 11/478,513

(22) Filed: Jun. 30, 2006

(65) Prior Publication Data

US 2007/0072655 A1 Mar. 29, 2007

Related U.S. Application Data

(63) Continuation-in-part of application No. 10/385,896, filed on Mar. 12, 2003, now abandoned.

(51) Int. Cl.
*H04M 1/00* (2006.01)
(52) U.S. Cl. .................................. 455/575.2; 370/271
(58) Field of Classification Search .............. 455/556.1, 455/575.2
See application file for complete search history.

(56) References Cited

U.S. PATENT DOCUMENTS

| 5,523,886 | A | * | 6/1996 | Johnson-Williams et al. ................. 359/464 |
| 6,356,773 | B1 | * | 3/2002 | Rinot ...................... 455/575.1 |
| 6,510,325 | B1 | * | 1/2003 | Mack et al. ............... 455/575.2 |
| 7,233,815 | B2 | * | 6/2007 | Tabata et al. ............. 455/575.2 |
| 2002/0132616 | A1 | * | 9/2002 | Ross et al. ................. 455/419 |
| 2002/0186180 | A1 | * | 12/2002 | Duda ........................... 345/8 |

* cited by examiner

*Primary Examiner*—Rafael Pérez-Gutiérrez
*Assistant Examiner*—Marcos Batista
(74) *Attorney, Agent, or Firm*—Evelyn M. Sommer

(57) ABSTRACT

A cellphone or wireless phone device has separate components which are carried or mounted in corresponding parts of a hat, cap, or other headgear worn by the user. The cellphone microphone or voice pickup component, preferably as a unidirectional device, may be carried in the forward brim of a hat or visor of a cap, the antenna may be lined in the rear part of the hat or cap, the speaker earpiece may be attached to one or both sides of the hat, the keypad may be mounted between the fabric layers of the visor of a cap or the inner liner of a hat or headgear, and the electronic circuitry, including parts such as amplifier, signal processor and switcher, and battery may be mounted in an internal part or inner liner of the hat.

7 Claims, 1 Drawing Sheet

HAT CELL PHONE OR WIRELESS DEVICE FOR HANDS-FREE USER-SAFE OPERATION

This application is a continuation-in-part of U.S. patent application Ser. No. 10/385,896 filed Mar. 12, 2003, now abandoned.

FIELD OF THE INVENTION

This invention generally relates to a hat or cap device having a cellphone or other wireless communication device mounted therein for hands-free, user-safe operation.

BACKGROUND ART

Cellphones, cordless phones, wireless phone devices, wireless messaging devices, etc. have entered into widespread usage throughout the world. People using cellphones and other wireless communication devices often find it awkward to operate a phone in many circumstances. For example, it is awkward to hold a cellphone for conversations while driving a vehicle or where one or both hands are occupied with an ongoing activity. In many localities in the united States and other countries of the world, using a cellphone in such circumstances is deemed unsafe and made illegal.

Carrying and storing a cellphone or wireless phone device on one's person can also be inconvenient, unsightly, or uncomfortable. Cellphones worn on the belt can be awkward or uncomfortable when the user sits down or leans back against a seat. when carried in the shirt or trousers pocket, they can create unsightly bulges or distortions in one's clothing. when carried in a purse or backpack, the user can be inconvenienced by having to open or unzip the carry pack and fumble around with its contents to find the phone.

The prolonged use of wireless transmitting devices close to one's head may also have deleterious health effects. In some countries, cellphone users have adopted wearing metallized shields on their head or around their ear to block exposure of soft brain tissue to RF radiation.

U.S. Pat. No. 6,356,773 issued to Rinot discloses a radiation shielded device in the form of a headgear that can be used as a cellphone.

SUMMARY OF THE INVENTION

A principal object of the present invention is to solve the problems of awkwardness, inconvenience, or unsafe conditions created by the use of cellphones and other wireless phone devices for the user. A specific object is to provide a device that allows a cellphone to be carried and operated in a "hands-free" manner and with protection of the user from prolonged exposure to RF radiation. A further object is to provide a device that integrates a wide range of functions useful to the user, such as global positioning, time, and video and text communications.

In accordance with the present invention, the components of a cellphone or wireless phone device has separate components which are carried or mounted in corresponding parts of a hat, cap, or other headgear worn by the user. The frame of the hat is preferably covered with either fabric or other suitable encompassing substance. The cellphone microphone or voice pickup component, preferably as a unidirectional device, may be carried in the forward brim of a hat or visor of a cap, the antenna may be lined in the rear part of the hat or cap, the speaker earpiece may be attached to one or both sides of the hat, the keypad may be mounted between the fabric layers of the visor of a cap or the inner liner of a hat or headgear, and the electronic circuitry, including parts such as amplifier, signal processor and switcher, and battery may be mounted in an internal part or inner liner of the hat. Preferably, the sound receiving and reproducing is achieved using transducer membranes. The hat may have battery recharge pins or points exposed for attachment to an external recharging unit. A metallized RF-blocking layer may be provided on an inner layer of the hat to block RF radiation from the antenna from the user's head. A global position system (GPS) unit is preferably provided on the hat. A first liquid crystal display (LCD) is provided, preferably on the brim or visor, to show the time, channel, cell phone displays, text messaging and GPS latitude and longitude coordinates. A second LCD is provided and hinged on the underside of the brim or visor. The second LCD can be folded up flat when it is not in use or folded down directly in front of either or both the wearer's eyes when it is in use. The second LCD is provided to display video images and text information received and/or controlled with the keypad. The transmission of the electronic signals between various parts located at various positions of the hat can be achieved using any conventional means, such as conductive wires, but is most preferably accomplished by the use of conductive paint applied as a precise, thin spray.

The cellphone components may be placed in selected parts or positions of the hat, cap or headgear depending upon its shape, structure, and mode of use. Various embodiments for mounting a cellphone or cordless phone in a sports cap, hamburg hat, sports helmet, or pith helmet are envisioned.

Other objects, features and advantages of the present invention are described in detail below in conjunction with the drawings, as follows:

DETAILED DESCRIPTION OF THE INVENTION

Figure 1:
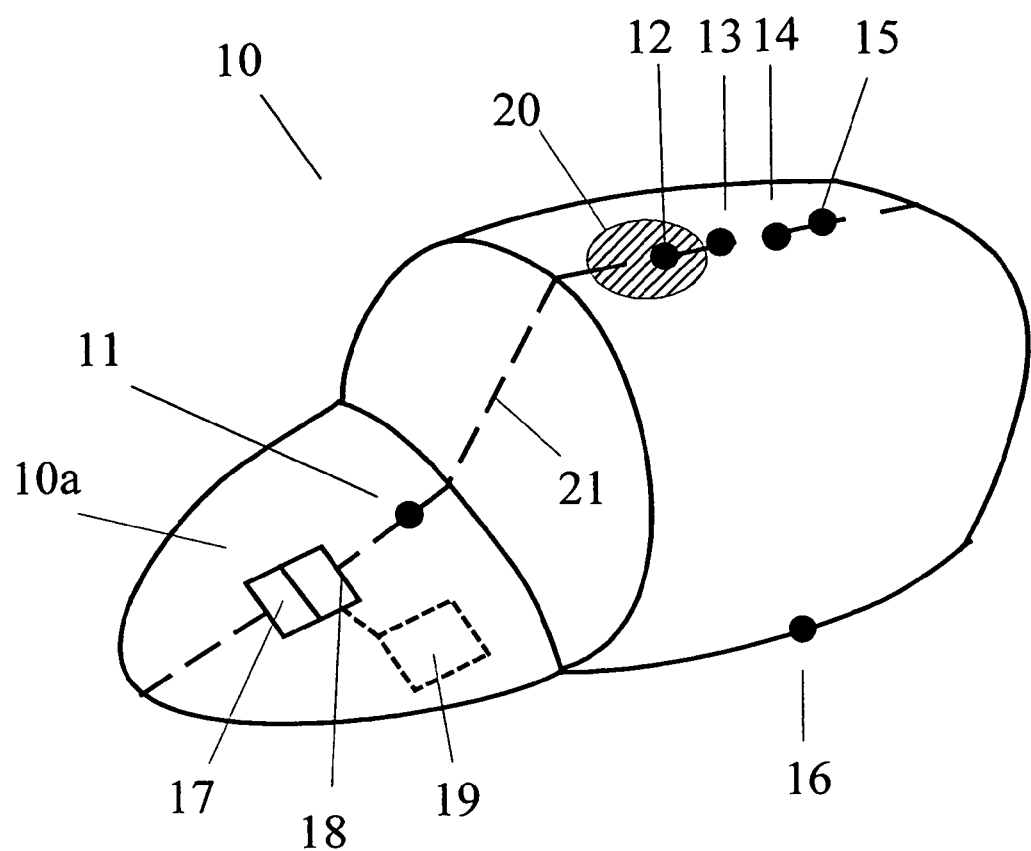
FIG. 1 is a perspective view of a preferred embodiment of the hat according to the present invention.

A conventional cellphone or cordless phone has the following typical components: a microphone or voice pickup; a speaker or earphone; a keypad; an antenna for transmitting wireless signals; electronic circuit board; and a battery. A cordless phone typically transmits an RF signal over short distances to a base station powered by wall current. A cellphone differs from a cordless phone in that it transmits a stronger RF signal at different frequencies which can be picked up by a cellular station receiving antenna in a wider area. In both instances of the present invention, the phone components are distributed and carried in appropriate parts of a hat, cap, or headgear for convenient, hands-free portability and user-safe operation. It may be desirable in cellphone versions to include an RF-blocking shield as a component to be mounted in the hat or cap.

As shown in FIG. 1, the cellphone components are mounted in parts of a sports or casual wear cap 10. The cellphone microphone or voice pickup component 11 is preferably carried in the forward brim or visor 10a of the cap 10, and most preferably 1 inch forward from the nose of the wearer, where it can pick up the sound of the user's voice. Preferably, the microphone or voice pickup component 11 is in the form of a transducer membrane and a unidirectional device directed to the mouth of the wearer. The antenna/receiver 12, electronic circuitry 13, a GPS unit 14 and battery 15 are lined in the inner fabric layer of the rear part of the cap. The speaker is carried in an earpiece 16 attached to one or both sides of the cap. The earpiece 16 is preferably in the form of a transducer membrane.

The electronic circuitry 13 and battery 15 are mounted to the inner liner of the cap at the top center part where there is normally space between the cap and the top of the user's head. The electronic circuitry, comprising amplifier, signal processor and switcher, receive and transmit sound signals to the earpiece 16 near the ear, the microphone 11 above the nose, sends and receives microwave and radio transmissions and global positioning information from the antenna as well as receiving keypad data from the keypad, and sending readout information to the LCD 18 and video information to the drop down screen 19. If the circuit board 13 is of the type that uses a memory chip or insertable microcard to store the phone ID data and/or phone numbers and other user-entered data, the circuit board is mounted in a manner that exposes the access door or tab to the memory chip or microcard on the inside of the cap. The chip or microcard may also store voice recognition templates input by the user for recognition of spoken commands or other words to control various phone functions (such as voice command or voice dialing).

The battery may be removable from inside the cap for recharging, or may have recharge pins or points exposed on the inside or outside of the cap 10 where they can be connected to an external recharging unit. A metallized RF-blocking shield or layer 20 may be provided in the inner fabric layer of the cap between the antenna 12 and the user's head to block RF radiation from the antenna from reaching the user's head. The RF-blocking shield may be formed by a laminate of a metallized film on a flexible substrate such as paperboard or foam board.

The keypad 17 is mounted between the fabric layers of the visor 10a of the cap. The keypad face and buttons may be exposed through an aperture in the underside fabric layer of the visor. Alternatively, the underside layer of the cap may be formed as a touchpad or membrane pad with button pads coupled to the keyboard substrate carried by the visor inner substrate. According to the preferred embodiment, the keypad 17 is located in the part of the frame that would be covered to make a peak. That position contains a soft flat rubber covered pad with buttons that can be operated from either the top side of the peak and from the bottom side as well. Keyed data include phone, microwave and cb channel dialing as well as entering and accessing GPS, time information, and on/off and standby.

A LCD 18, preferably provided at the bottom side of the peak where the keypad is located, shows the GPS latitude and longitude coordinates, time and channel as well as cell phone displays and text messaging.

A second LCD 19 is also provided on the underside of the visor and is hinged to the visor. The second LCD can be folded up flat when it is not used and folded down directly in front of either or both the wearer's eyes. This screen receives video image and text information controlled with the keypad.

The transmission of the electronic signals between various parts is accomplished using any known means, such as by use of thin wires. The preferred means is by the use of conductive paint 21 applied as a precise and thin spray.

Although the invention has been described with reference to the preferred embodiments, it will be appreciated that many other variations and modifications thereof may be devised in accordance with the principles disclosed herein. The invention, including the described embodiments and all such variations and modifications thereof, is defined in the following claims.

I claim:

1. A cell phone or wireless phone device having separate components consisting of a forward mounted voice pickup, an antenna, a side mounted speaker earpiece, a visor mounted keypad, electronic circuitry, a global positioning system unit, a first visor mounted display for displaying output from said global positioning system unit, time, channel for phone transmission and text messaging, a second visor mounted display for displaying video image and text information, a battery and an inner mounted RF-blocking layer wherein said components are separately mounted in selected parts of a hat or cap and configured to provide hands-free operation.

2. A cell phone or wireless phone device according to claim 1, wherein said forward mounted voice pickup is mounted in a forward brim or visor of the hat or cap.

3. A cell phone or wireless phone device according to claim 2, wherein said forward mounted voice pickup is a unidirectional unit.

4. A cell phone or wireless device according to claim 1, wherein said side mounted speaker earpiece is mounted on at least one side of the hat or cap adjacent to an ear of a user.

5. A cell phone or wireless phone device according to claim 1, wherein said electronic circuitry comprise amplifier, signal processor and switcher.

6. A cell phone or wireless phone device according to claim 1, wherein said inner mounted electronic circuitry is mounted on an inner liner on the inside of the hat or cap.

7. A cell phone or wireless phone device according to claim 1, wherein said RF-blocking layer is a metallized RF-blocking layer which is provided on an inner part of the hat or cap, positioned between the antenna and a user's head.

* * * * *